United States Patent Office 3,803,166
Patented Apr. 9, 1974

---

3,803,166
p-[2-(1-PHENYL - 3,5 - DIOXY-4-n-BUTYL)-PYRAZO-LYDINYL]PHENYLPHOSPHORIC ACID, ITS ORGANIC AND INORGANIC SALTS
René Viterbo, 76 Bis, Rue de Saint Pares 75, Paris VIIe, France; and Angelo Larizza, 19 Via Girolamo Santacroce; and Giulio Cesare Perri, 2 Via Traversa Manzoni, both of Naples, Italy
No Drawing. Filed Mar. 27, 1972, Ser. No. 238,554
Claims priority, application Italy, Apr. 21, 1971, 49,877/71
Int. Cl. C07d 49/08
U.S. Cl. 260—310 B                4 Claims

ABSTRACT OF THE DISCLOSURE p-[2-(phenyl - 3,5 - dioxy - 4 - n-butyl)-pyrazolydinyl] phenylphosphoric acid of the formula

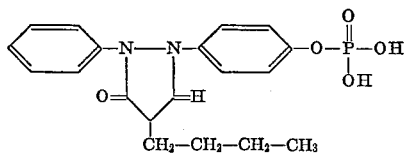

and pharmaceutically acceptable inorganic and organic salts thereof are included in this invention. The compounds have antiphlogestic and antipyretic activity.

SUMMARY OF INVENTION

This invention refers to the p-[2-(1-phenyl-3,5-dioxy-4-n-butyl)-pyrazolydinyl]-phenylphosphoric acid, its organic and inorganic salts and the process to prepare them

DETAILS OF INVENTION

In particular this invention refers to p-[2-(phenyl-3,5-dioxy-4-n-butyl)-pyrazolydinyl]phenylphosphoric acid of Formula I (I)

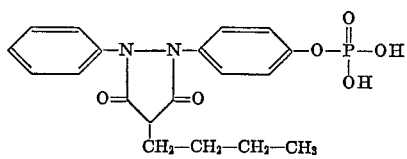

and to the process to prepare the same. This invention relates also to the salts formed by this acid and pharmaceutically acceptable inorganic or organic bases. Among the possible inorganic salts there are sodium salt, potassium salt and calcium salt, whereas among the organic ones are included those salts formed by basic substances having pharmacological activity such as α-p-phenetidino-N-n-propylpropionamide, aminopyrine, ethanolamine and diethanolamine.

For a systematic study of the pharmacological activities, the calcium salt of Formula II

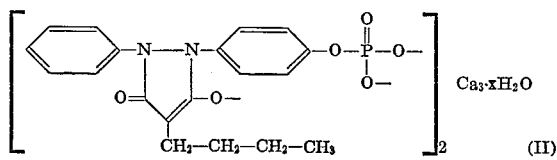

in which $x$ is from 0 to 14, and the sodium salt of Formula III

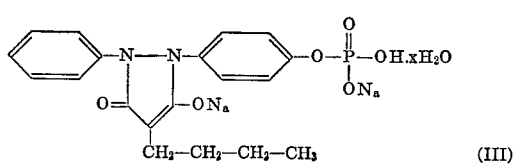

in which $x$ is from 0 to 8 were chosen. They are stable in aqueous solution or in buffers with different pH. More particularly, the sodium salt, at room temperature in buffer with pH 8.8, does not show degradation after 20 hours; whereas at 100° C. in buffer solution (pH 8.8), there is 50% of degradation. The sodium salt III is easily dissolved in water and in buffers with pH 6.5–7 up to a concentration of about 500 mg./ml. For this reason it can be administered intramuscularly or intravenously at high concentration. When the calcium II and sodium III salts were administered orally, intramuscularly, intravenously or rectally, no intolerance of the drug was noticed.

Furthermore, the salts of this invention are not absorbed in the stomach, but they pass directly into the intestine where they are absorbed. Therefore they have no irritant effect on the gastric mucous membrane such as those caused by other drugs.

The compounds of this invention are prepared by reacting 4-n-butyl-2-(p-hydroxyphenyl)-1-phenyl-3,5-pyrazolydindione with phosphoryl chloride dissolved in an aprotic solvent such as ethyl ether, benzol, toluol, xylol, tetrahydrofuran, petroleum ether or other solvent stable under reaction conditions. To neutralize the hydrochloric acid split off during the reaction, the solvent is added to an organic or inorganic base able to form salts with hydrochloric acid. In the process of the invention anhydrous pyridine was used, but also trialkylamine, dialkylarylamines, N'-alkylazocycloalkane, inorganic oxides, hydroxides, carbonates or bicarbonates are also suitable.

The reaction temperature ranges between 0° C. and 50° C. The reaction product is treated according to the well known methods of the preparatory organic chemistry. The cooled mixture is added with water, then it is dried and the residue is neutralized by aqueous MgO. The solution is desalted using an ion exchanger resin, such as Amberlite I.R.–120, or purified by chromatography over a resin such as Dowex-I-$CO_2$.

To isolate the calcium salt it proved more advantageous to avoid using resins. The reaction mixture is filtered when cold and the precipitate is dissolved, at room temperature, in water having a highly alkaline pH which was obtained by adding CaO and/or $Ca(OH)_2$. The solution thus obtained is concentrated to a small volume and added to a water miscible solvent such as methyl alcohol, ethyl alcohol, acetone or other solvent in which the salt is insoluble. The precipitate obtained is the calcium salt of Formula II which can be further purified by dissolution in water and precipitation by adding methyl or ethyl alcohol or acetone. Generally, to obtain an analytically pure salt it is sufficient to repeat this operation twice. The calcium salt absorbed crystallization water. After five days of exposure to the air a salt with 14 molecules of crystallization water was isolated.

Additionally, salts with a different number of water molecules were isolated and among them a salt with 8 molecules of crystallization water was chosen for the pharmacological tests. The salt was obtained leaving the reaction product in the air contact for 7 hours, drying it at 70° C. and under high vacuum.

The anhydrous calcium salt or hydrate form of it is dissolved in 50–100 volumes of distilled water and the solution is poured on an ion exchanger resin column such as Amberlite I.R.–120 or Dowex 50 W X2. The eluted product is collected when the pH is clearly acid to pH between 1 and 5. From this solution we obtain:

(1) the free acid by concentrating the solution under vacuum at a temperature lower than 45° C. until a volume equal to one tenth of the starting solution and then by lyophilizing it;

(2) the sodium salt by adding a solution of N NaOH, or of N $Na_2CO_3$ or of N $NaHCO_3$ to reach pH 7.8–8, and concentrating under vacuum at a temperature lower than 45° C. and lyophilizing;

(3) the addition salt with an organic base dissolved in a water miscible solvent such as methanol, ethanol, acetone: the solution is concentrated under vacuum at a temperature lower than 45° C., the residue is washed several times with a water non-miscible solvent such as ethyl ether, benzol, and dissolved in a little acetone; by settling at a temperature between 0° C. and 10° C. a precipitate is obtained which is purified by several washings with a water non-miscible solvent.

The chemical structure of the compounds are confirmed by infrared and ultraviolet spectra, by the correspondence between calculated values for the elements and values found by chemical analysis, and by the results of the enzymatic hydrolysis which produces the starting compounds.

The octohydrate calcium salt (II) and the sodium salt (III) of (I) acid were pharmacologically tested to evaluate the acute toxicity, the antiphlogistic and antipyretic activity. During these tests no phenomena of intolerance of the two drugs was exhibited. In the test of acute toxicity the substance was administered in differing doses, spaced on logarithmic scale, in groups of 5 animals each dose. Mortality was observed for 8 days and the $LD_{50}$ was calculated according to the Spearman-Kärber method (ref. Finney, D. J.: Statistical Method in Biological Assay, 2nd ed., London (1964), page 524).

TOXICITY

TABLE 1

| Compound | $LD_{50}$ mg./kg. (LF, P=0.05) | | | | |
|---|---|---|---|---|---|
| | Mice | | Rats | | |
| | Os | I.v. | Os | I.v. | I.m. |
| Ca·H₂O salt | 1,117 (943–1,226) | | | | |
| Sodium salt | 401 (311–517) | 170 (155–186) | 782 (669–924) | 205 (134–316) | 213 (172–263) |

The antiphlogistic activity was investigated using the following tests:

(1) Carrageenan Oedema—Winter C. A. et coll.: Proc. Soc. Exper. Biol. Med. 111, 544 (1962)
(2) Formalin Ascite—Wilhelmi G.—Schwz. Med. Wshr. 88, 185 (1953)
(3) Granuloma pouch—Selye H. Proc. Soc. Exp. Biol. Med. 82, 328 (1953).

In Table 2 there are data referring to the octahydrate calcium salt.

TABLE 2
Carrageenan oedema (rat)

| Mg./kg./os dose | Percent reduction of the oedema |
|---|---|
| 78 | −11.9 |
| 156 | −18.41 |
| 312 | −21.83 |

In Tables 3 to 8 there are results referring to the sodium salt.

TABLE 3
Carrageenan oedema on normal rats

| Mg./kg. dose | Percent inhibition in different times | | | Number of animals |
|---|---|---|---|---|
| | 3 hours | 4½ hours | 6 hours | |
| 50 | −16.47 | +0.2 | −5.02 | 10 |
| 25 | −34.23 | −22.91 | −33.22 | 10 |
| 12.5 | −33.05 | −25.70 | −35.04 | 10 |

TABLE 4
Carrageenan oedema on adrenalectomized rats

| Mg./kg. dose | Percent inhibition in different times | | | Number of animals |
|---|---|---|---|---|
| | 3 hours | 4½ hours | 6 hours | |
| 50 | −40.45 | −29.38 | −24.29 | 10 |
| 25 | −31.54 | −8.09 | −13.77 | 10 |
| 12.5 | −21.03 | −1.62 | −7.75 | 10 |

TABLE 5
Formalin ascites on normal rats

| Mg./kg. dose | Percent inhibition after— | | Number of animals |
|---|---|---|---|
| | 4 hours | 8 hours | |
| 50 | −48.22 | −27.77 | 5+5 |
| 25 | −23.40 | −18.33 | 5+5 |
| 12.5 | −7.80 | −12.77 | 5+5 |

TABLE 6
Formalin ascites on adrenalectomized rats

| Mg./kg. dose | Percent inhibition after— | | Number of animals |
|---|---|---|---|
| | 4 hours | 8 hours | |
| 50 | −44.64 | −10.63 | 5+5 |
| 25 | −27.97 | −29.78 | 5+5 |
| 12.5 | −12.50 | −26.24 | 5+5 |

TABLE 7
Granuloma pouch on normal rats

| Mg./kg. dose | Percent inhibition | | Number of animals |
|---|---|---|---|
| | Exudate | Pouch weight | |
| 50 | −32.59 | −30.82 | 5 |
| 25 | −5.88 | −25.04 | 5 |
| 12.5 | +11.76 | −15.89 | 5 |

TABLE 8
Granuloma pouch on adrenalectomized rats

| Mg./kg. dose | Percent inhibition | | Number of animals |
|---|---|---|---|
| | Exudate | Pouch weight | |
| 50 | −53.24 | −30.91 | 5 |
| 25 | −10.38 | −20.77 | 5 |
| 12.5 | −27.27 | −6.6 | 5 |

The antipyretic activity was tested in the octahydrate calcium phosphate (I) salt and the results are in Table 9.

TABLE 9
Antipyresis—rat, os

| Mg./kg. dose | Percent reduction of temperature |
|---|---|
| 78 | −2.59 |
| 156 | −3.77 |
| 312 | −4.89 |

In Table 10 there are the results of antipyresis test in rats for the sodium salt after having induced temperature produced by yeast.

TABLE 10

| Mg./kg. dose | After 1 hour | After 2 hours | After 4 hours | Number of animals |
|---|---|---|---|---|
| Control | +0.14 | +0.10 | +0.54 | 5 |
| 50 | −1.40 | −0.66 | −0.24 | 5 |
| 25 | −0.62 | −0.34 | +0.20 | 5 |
| 12.5 | −0.24 | +0.22 | +0.68 | 5 |

The phosphate, the object of this invention in the form of free acid, or as sodium or calcium salt, or as addition salts with organic compounds, can be administered separately or associated with other substances having therapeutic activity, orally, intramuscularly, intravenously, or rectally at a dose between 50 and 2000 mg./kg. daily.

For the oral administration, tablets can be prepared according to the following composition:

|  | Mg. |
|---|---|
| Calcium salt (II) | 50 |
| Lactose | 250 |
| Mais starch | 60 |
| "Avicel" (microcrystalline cellulose) | 30 |
| Mg stearate | 10 |
| Total | 400 |

| Calcium salt (II) | 150 |
|---|---|
| Lactose | 250 |
| Mais starch | 60 |
| "Avicel" (microcrystalline cellulose) | 30 |
| Mg stearate | 10 |
| Total | 500 |

| α-p-Phenetidino - N - n - propylpropionamide phosphate (I) | 50 |
|---|---|
| Lactose | 200 |
| Mais starch | 60 |
| "Avicel" (microcrystalline cellulose) | 30 |
| Mg stearate | 10 |
| Total | 350 |

For suppositories:
Bisodium (III) salt fat excipient enough for 1.5 g. _____ 50
Bisodium (III) salt fat excipient enough for 2.0 g. _____ 200

While for intramuscular or intravenous syringes:
Bisodium (III) salt lyophilized _____ 50
Distilled water or physiologic solution, 1 ml.

The following examples are illustrative of the invention and do not limit the invention.

EXAMPLE 1 p-[2-(1-phenyl-3,5-dioxy-4-n-butyl)-pyrazolydinyl]-phenylphosphate calcium salt 10 g. (0.066 mole) of phosphoryl chloride just distilled and 350 ml. of ethyl ether are put in a three necked flask. 20 g. (0.062 mole) of 4-butyl - 2 - (p-hydroxyphenyl)-1-phenyl - 3,5 - pyrazolydindione and 20 ml. of anhydrous pyridine dissolved in 250 ml. of anhydrous ether are slowly added to the solution under stirring and at room temperature. The precipitate formed is filtered, washed with ethyl ether, then dried under vacuum: yield 40 g.

The solid, washed with water, is suspended in 1,800 ml. of saturated calcium hydroxide solution; after the substance has been dissolved, calcium oxide is added until the solution has pH 12, then it is filtered. The ethereal solution obtained by washing the evaporated precipitate gives an oily residue which is treated with a saturated solution of calcium hydroxide and then with calcium oxide to reach pH 12, then it is filtered. The two aqueous solutions collected are concentrated under vacuum and at 35° C. to a final volume of 300 ml. By adding 300 ml. of ethanol this solution gives a precipitate which is washed with ethyl alcohol and ethyl ether. Yield: 18.5 g.

The precipitate is suspended in 500 ml. of water and kept under stirring for 2 hours. It is filtered, the insoluble residue is discarded whereas the solution (pH 12.1) is concentrated under vacuum and at 35° to a volume of 250 ml. 300 ml. of ethyl alcohol are added to the solution. The insoluble residue is filtered, washed with a hydroalcoholic solution (1:2) then with ethanol and finally with ethyl ether. The product obtained (10.8 g.) is further purified by extracting with 300 ml. of water. The insoluble residue is discarded and the aqueous solution (pH 9.3) is concentrated to 130 ml.; by adding 150 ml. of ethanol, a precipitate is obtained which is washed with an hydroalcoholic solution (1:2), then ethyl alcohol, then ethyl ether, and then it is dried under vacuum. Yield: 6.6 g. of p-[2-(1-phenyl - 3,5 - dioxy - 4 - n - butyl)-pyrazolydinyl]phenylphosphate calcium salt.

The calcium salt left in contact with the air absorbs crystallization water; after 7 hours a salt with 8 $H_2O$ is obtained which is dried under high vacuum and at 70° C. After 5 days the water molecules are 14.

(a) *Elementary analysis* (with dried sample under high vacuum and at 70° C.).—Calculated for $$C_{38}H_{36}N_4O_{12}Ca_3P_2 \cdot 8H_2O$$

(percent): C, 42.77; H, 4.87; N, 5.25; P, 5.81; Ca, 11.27. Found (percent): C, 42.57; H, 5.15; N, 5.24; P, 5.80; Ca, 11.41.

$H_2O$ 13.5 (K.F.)

U.V.:
$\lambda_{max}$=135 m$\mu$; $\epsilon$=31,300 (pH 1; in HCl 0.1 N)
$\lambda_{max}$=262 m$\mu$; $\epsilon$=39,800 (pH 8.8; borated buffer +HCl 0.1 N)

I.R. (KBr): 1620; 1310; 1240; 1010 cm.$^{-1}$
Electrophoresis: Munketell paper n. 20—acetate buffer pH 5.2; one spot only migrates toward the visible anode at U.V.

(b) Calculated for $C_{38}H_{36}N_4O_{12}Ca_3P_2 \cdot 14H_2O$ (percent): C, 38.81; H, 5.49; N, 4.76; Ca, 10.20; P, 5.60. Found (percent): C, 38.67; H, 5.86; N, 4.43; Ca, 10.52; P, 5.60.

U.V.:
$\lambda_{max}$=235 m$\mu$; $\epsilon$=30,800 (pH 1; HCl 0.1 N)
$\lambda_{max}$=262 m$\mu$; $\epsilon$=40,500 (pH 8.8)

I.R. (KBr): 1620; 1310; 1240; 1010 cm.$^{-1}$.

Enzymatic hydrolysis p-[2-(1-phenyl-3,5-dioxy-4-n-butyl)-pyrazolydinyl]phenylphosphate calcium salt 29.43 mg. of 4-butyl-2-(p-hydroxyphenyl)-1-phenyl-3,5-pyrazolydindione phosphate calcium salt · 8 $H_2O$ dissolved in 100 ml. of citrate buffer pH 4.8 are added to a solution of 80 mg. of acidulous phosphatase (Mann Research Laboratories) dissolved in 20 ml. of distilled $H_2O$. The mixture is left at room temperature for 45 minutes; the hydrolysis is controlled while determining the inorganic phosphorus which splits off. The solution is extracted with chloroform which is washed with water to neutralization. It is dried over $Na_2SO_4$ and the solvent is discarded under vacuum. The residue is p-hydroxyphenylbutazone.

U.V.: $\lambda_{max}$=260 m$\mu$; $\epsilon$=21,300
I.R. spectra is similar to the I.R. spectra of a sample of 4-butyl-2-(p-hydroxyphenyl) - 1 - phenyl-3,5-pyrazolydindione.

EXAMPLE 2 p-[2-(1-phenyl-3,5-dioxy-4-n-butyl)pyrazolydinyl]phenylphosphate acid 12 g. of calcium p-[2-(1-phenyl-3,5-dioxy-4-n-butyl)pyrazolydinyl]phenylphosphate are dissolved in 600 ml. of water, the mixture is filtered. The solution is poured on a Dowex 50 W X2 H+ (50+100 mesh) column (5.5 cm. diameter, 30 cm. height) and it is eluted with distilled water. The eluted solution having a pH lower than 4 is collected. 1,200 ml. of solution were collected, then concentrated under vacuum at a temperature lower than 40° C. to a volume of 60 ml. This filtered solution is lyophilized. Yield: 3.2 g. (80%) of p-[2-(1-phenyl-3,5-dioxy-4-n-butyl)pyrazolydinyl]phenylphosphate acid.

Calculated for $C_{19}H_{21}N_2O_6P$ (percent): C, 56.44; H, 5.23; N, 6.92; P, 6.67. Found (percent): C, 55.55; H, 5.59; N, 7.00; P, 7.15.

U.V in HCl 01 N:
$\lambda_{max}$=235 m$\mu$, $\epsilon$=15,100;
in buffer pH 8.8:
$\lambda_{max}$=260$\mu$, $\epsilon$=19,450.

EXAMPLE 3 p-[2-(1-phenyl-3,5-dioxy-4-n-butyl)pyrazolydinyl]phenylphosphate bisodium salt 12 g. of calcium p-[2-(1-phenyl-3,5-dioxy-4-n-butyl)-pyrazolydinyl]phenylphosphate are dissolved in 600 ml. of water and filtered. The solution is poured on a Dowex 50 W X2 H+ (50+100 mesh) column (3.5 cm. diameter, 30 cm. height) and it is eluted with distilled water. The eluted solution having pH lower than 4 is collected. 1200 ml. of solution are collected and, by adding N NaOH, its pH reaches 6.8–7 with N NaOH. The solution is concentrated under vacuum and at a temperature lower than 40° C. to a volume of 60 ml. This solution is filtered and lyophilized. Yield: 3.3 g. of p-[2-(1-phenyl-3,5-dioxy-4-n-butyl)pyrazolydinyl]phenylphosphate bisodium salt.

Calculated for $C_{19}H_{19}N_2O_6PNa_2 \cdot 4H_2O$ (percent): C, 43.48; H, 5.22; N, 5.38; P, 5.95. Found (percent): C, 43.43; H, 4.92; N, 5.55; P, 5.65. $H_2O$=14.8% (calculated 13.9%).

EXAMPLE 4 p-[2-(1-phenyl - 3,5 - dioxy - 4 - n-butyl)pyrazolydinyl] phenylphosphate of α - p - phenetidino-N-n-propyl-propionamide 9.5 g. of p-[2-(1-phenyl-3,5-dioxy-4-n-butyl)-pyrazolydinyl]phenylphosphate calcium salt are chromatographed on Dowex 50 X2 form H+ by eluting with water. 1000 ml. of solution having pH lower than 4 are collected. The eluted mixture is mixed with an ethanolic solution of α-p-phenetidino-N-n-propyl-propionamide (8.04 g.) and the solution obtained is evaporated to dryness at lowered pressure and at 40° C. The gummy residue obtained is washed three times with 60 cc. of ethyl ether each time. The residue is then diluted in 70 ml. of acetone and the solution is left in the refrigerator. The crystallized product is washed with ethyl ether. After drying under high vacuum 8.5 g. of [2-(1-phenyl-3,5-dioxy-4-n-butyl)pyrazolydinyl]phenylphosphate of α - p-phenetidino-N-n-propyl-propionamide are obtained. M.P. 93–101° C.

Calculated for $C_{33}H_{43}N_4O_8P$ (percent): C, 60.54; H, 6.62; N, 8.57. Found (percent): C, 60.26; H, 6.64; N, 8.40.

U.V.: $\lambda_{max}$=240 m$\mu$; $\epsilon$=30,600.

We claim:
1. p-[2 - (1-phenyl-3,5-dioxy-4-n-butyl)-pyrazolydinyl] phenylphosphoric acid having the formula:

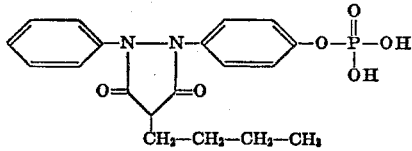

and its pharmaceutically acceptable organic and inorganic salts.

2. A calcium salt of the acid of claim 1 having the formula:

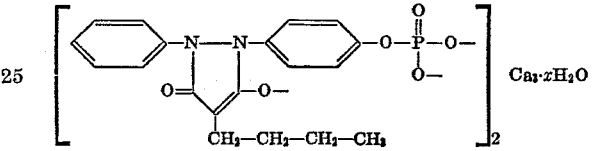

in which $x$ may be from 0 to 14.

3. A sodium salt of the acid of claim 1 having the formula:

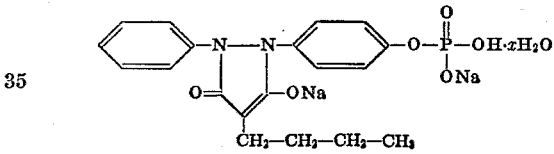

in which $x$ may be from 0 to 8.

4. p-[2 - (1-phenyl-3,5-dioxy-4-n-butyl)pyrazolydinyl]-phenylphosphate of α - p-phenetidino-N-n-propyl-propionamide.

References Cited

UNITED STATES PATENTS 3,629,282  12/1971  Negrevergne _____ 260—310 B
3,703,528  11/1972  Casadio et al. _____ 260—310 B HENRY R. JILES, Primary Examiner
G. T. TODD, Assistant Examiner U.S. Cl. X.R.
424—273